(12) United States Patent
Nagaoka et al.

(10) Patent No.: US 9,272,955 B2
(45) Date of Patent: *Mar. 1, 2016

(54) FERRITE MAGNETIC MATERIAL

(75) Inventors: Junichi Nagaoka, Chuo-ku (JP); Takahiro Mori, Chuo-ku (JP); Hiroyuki Morita, Chuo-ku (JP); Yoshihiko Minachi, Chuo-ku (JP)

(73) Assignee: TDK CORPORATION, Tokyo (JP)

( * ) Notice: Subject to any disclaimer, the term of this patent is extended or adjusted under 35 U.S.C. 154(b) by 701 days.

This patent is subject to a terminal disclaimer.

(21) Appl. No.: 13/382,211

(22) PCT Filed: Jul. 5, 2010

(86) PCT No.: PCT/JP2010/061403
§ 371 (c)(1),
(2), (4) Date: Mar. 19, 2012

(87) PCT Pub. No.: WO2011/004791
PCT Pub. Date: Jan. 13, 2011

(65) Prior Publication Data
US 2012/0161910 A1    Jun. 28, 2012

(30) Foreign Application Priority Data
Jul. 8, 2009    (JP) ................. 2009-161927

(51) Int. Cl.
| *H01F 1/10* | (2006.01) |
| *C04B 35/26* | (2006.01) |
| *C01G 49/00* | (2006.01) |
| *C04B 35/626* | (2006.01) |

(Continued)

(52) U.S. Cl.
CPC .......... *C04B 35/2633* (2013.01); *C01G 49/009* (2013.01); *C01G 49/0018* (2013.01); *C01G 49/0036* (2013.01); *C04B 35/2641* (2013.01); *C04B 35/6262* (2013.01); *C04B 35/632* (2013.01); *H01F 1/10* (2013.01); *H01F 1/11* (2013.01); *C01P 2002/52* (2013.01); *C01P 2006/42* (2013.01); *C04B 2235/32* (2013.01); *C04B 2235/3203* (2013.01); *C04B 2235/3206* (2013.01); *C04B 2235/3208* (2013.01); *C04B 2235/3213* (2013.01); *C04B 2235/3215* (2013.01); *C04B 2235/3217* (2013.01); *C04B 2235/3224* (2013.01); *C04B 2235/3225* (2013.01); *C04B 2235/3227* (2013.01); *C04B 2235/3232* (2013.01); *C04B 2235/3239* (2013.01); *C04B 2235/3241* (2013.01); *C04B 2235/3244* (2013.01); *C04B 2235/3251* (2013.01); *C04B 2235/3256* (2013.01); *C04B 2235/3258* (2013.01); *C04B 2235/3262* (2013.01); *C04B 2235/3275* (2013.01); *C04B 2235/3277* (2013.01); *C04B 2235/3279* (2013.01); *C04B 2235/3281* (2013.01); *C04B 2235/3284* (2013.01); *C04B 2235/3286* (2013.01); *C04B 2235/3287* (2013.01); *C04B 2235/3293* (2013.01); *C04B 2235/3294* (2013.01); *C04B 2235/3298* (2013.01); *C04B 2235/3409* (2013.01); *C04B 2235/3418* (2013.01); *C04B 2235/549* (2013.01); *C04B 2235/5409* (2013.01); *C04B 2235/5436* (2013.01); *C04B 2235/5445* (2013.01); *C04B 2235/605* (2013.01); *C04B 2235/72* (2013.01); *C04B 2235/767* (2013.01); *C04B 2235/94* (2013.01); *C04B 2235/95* (2013.01); *C04B 2235/9615* (2013.01)

(58) Field of Classification Search
CPC ............. H01F 1/10; H01F 1/11; C04B 35/26; C04B 35/2608; C04B 35/2641; C04B 35/2666; C04B 35/2633
USPC .......................................... 252/62.55–62.63
See application file for complete search history.

(56) References Cited

U.S. PATENT DOCUMENTS

| 6,139,766 | A | 10/2000 | Taguchi et al. |
| 6,402,980 | B1 | 6/2002 | Taguchi et al. |
| 7,837,893 | B2 | 11/2010 | Takami et al. |

(Continued)

FOREIGN PATENT DOCUMENTS

| CN | 101395680 | 3/2009 |
| EP | 0 905 718 | 3/1999 |

(Continued)

OTHER PUBLICATIONS

Communication issued Jul. 2, 2015 in counterpart European Patent Application No. 10797102.0.

(Continued)

*Primary Examiner* — Matthew E Hoban
(74) *Attorney, Agent, or Firm* — Drinker Biddle & Reath LLP

(57) ABSTRACT

An object of the present invention is to provide a ferrite magnetic material capable of providing a permanent magnet in which high Br and HcJ are kept, and which has a high Hk/HcJ. A ferrite magnetic material in accordance with a preferred embodiment has a ferrite phase having a hexagonal structure and has a main composition represented by $Ca_{1-w-x-y}R_wSr_xBa_yFe_zM_mO_{19}$ (R is at least one element of rare earth elements (including Y) essentially including La, and Bi, and M is at least one element of Co, Mn, Mg, Ni, Cu, and Zn essentially including Co), where $0.25<w<0.65$, $0.01<x<0.45$, $0.0002<y<0.011$, $y<x$, $8<z<11$, $1.0<w/m<2.5$, and $0.017<m/z<0.065$ are satisfied. The total amount of a Si component is 0.1 to 3 mass % based on the amount of the main composition, and respective elements satisfy the relationship of $1.5 \leq [(Ca+R+Sr+Ba)-(Fe+M)/12]/Si \leq 3.5$.

3 Claims, 2 Drawing Sheets

(51) Int. Cl.
*C04B 35/632* (2006.01)
*H01F 1/11* (2006.01)

(56) References Cited

U.S. PATENT DOCUMENTS

| | | | |
|---|---|---|---|
| 7,906,036 B2 | 3/2011 | Takami et al. | |
| 8,021,567 B2 | 9/2011 | Takami et al. | |
| 8,303,837 B2 | 11/2012 | Takami et al. | |
| 8,591,760 B2 * | 11/2013 | Yanagida et al. | 252/62.63 |
| 2006/0284136 A1 * | 12/2006 | Takami et al. | 252/62.63 |
| 2007/0138432 A1 * | 6/2007 | Minachi et al. | 252/62.63 |
| 2009/0314981 A1 | 12/2009 | Yanagida et al. | |
| 2012/0211910 A1 | 8/2012 | Takami et al. | |

FOREIGN PATENT DOCUMENTS

| | | |
|---|---|---|
| EP | 1 798 211 | 6/2007 |
| EP | 1 953 123 | 8/2008 |
| EP | 2 043 112 | 4/2009 |
| EP | 1 652 829 | 5/2009 |
| JP | 2000-223307 | 8/2000 |
| JP | 3163279 | 2/2001 |
| JP | 2007-258880 | 10/2007 |
| JP | 4078566 | 2/2008 |
| KR | 10-2007-0017466 | 2/2007 |
| KR | 10-2009-0010175 | 1/2009 |
| WO | WO 2005/027153 | 3/2005 |
| WO | 2007/077811 | 7/2007 |
| WO | 2008/105449 | 9/2008 |

OTHER PUBLICATIONS

Communication issued May 26, 2015 in counterpart European Patent Application No. 10797102.0.

* cited by examiner

FERRITE MAGNETIC MATERIAL

TECHNICAL FIELD

The present invention relates to a ferrite magnetic material.

BACKGROUND ART

As the material for a permanent magnet formed of an oxide, there is known hexagonal system M type (magnetoplumbite type) Sr ferrite or Ba ferrite. The ferrite magnetic materials made of the ferrites are made available as permanent magnets in the form of ferrite sintered bodies or bonded magnets. In recent years, with miniaturization and enhancement of performances of electronic components, permanent magnets made of ferrite magnetic materials have also been required to have high magnetic characteristics while being small-sized.

As the indexes of the magnetic characteristics of a permanent magnet, generally, the residual magnetic flux density (Br) and the coercive force (HcJ) are used. Those which are high in these are evaluated as having high magnetic characteristics. Conventionally, from the viewpoint of improving the Br and the HcJ of the permanent magnet, a study has been done by the changing of the composition such as the inclusion of a prescribed element in a ferrite magnetic material.

For example, in the following Patent Document 1, there is shown oxide magnetic materials capable of providing a ferrite sintered magnet having high Br and HcJ by allowing M type Ca ferrite to include at least La, Ba, and Co.

Further, in the following Patent Document 2, there are disclosed oxide magnetic materials capable of providing ferrite sintered magnets having high Br and HcJ by allowing M type Ca ferrite to include La, Sr, and Co. Further, in the following Patent Document 3, there are disclosed sintered magnets having high Br and HcJ by allowing M type Sr ferrite to include Sr, La, and Co.

CITATION LIST

Patent Documents

[Patent Document 1] Japanese Patent Publication No. 4078566
[Patent Document 2] WO 2007/077811
[Patent Document 3] Japanese Patent Publication No. 3163279

SUMMARY OF THE INVENTION

Technical Problem

As described above, attempts have been made to variously change the combination of elements to be added to the main composition in order to favorably obtain both of the Br and the HcJ. However, what combination of additive elements provides high characteristics has not yet been elucidated.

Further, it is preferable for a permanent magnet to have high Br and HcJ, and in addition, to be also high in ratio of the value (Hk) of the magnetic field when magnetization is 90% of the Br to the HcJ, a so-called squareness ratio (Hk/HcJ). A high Hk/HcJ results in less demagnetization due to the external magnetic field or changes in temperature, which provides stable magnetic characteristics.

Therefore, it is preferable for a permanent magnet using a ferrite magnetic material to be able to acquire high Br and HcJ, and to acquire an excellent Hk/HcJ. However, an improvement in any characteristic results in degradation of other characteristics. Like this and others, it has not been conventionally easy at all to obtain a ferrite magnetic material capable of providing a permanent magnet having such three characteristics.

Thus, the present invention was completed in view of such circumstances. An object is to provide a ferrite magnetic material capable of providing a permanent magnet in which high Br and HcJ are kept, and further which has a high Hk/HcJ, and a magnet made of such a ferrite magnetic material.

Solution to Problem

In order to attain the foregoing object, the ferrite magnetic material of the present invention is a ferrite magnetic material having a main phase including a ferrite phase having a hexagonal structure. The ferrite magnetic material has a main composition represented by the following formula (1):

$$Ca_{1-w-x-y}R_wSr_xBa_yFe_zM_mO_{19} \quad (1)$$

(where in the formula (1), R is at least one element selected from the group consisting of rare earth elements (including Y) and Bi, and includes at least La, and M is at least one element selected from the group consisting of Co, Mn, Mg, Ni, Cu, and Zn, and includes at least Co.)

In the formula (1), w, x, y, z, and m satisfy the following formulae (2), (3), (4), (5), (6), (7), and (8):

$$0.25 < w < 0.65 \quad (2)$$

$$0.01 < x < 0.45 \quad (3)$$

$$0.0002 < y < 0.011 \quad (4)$$

$$y < x \quad (5)$$

$$8 < z < 11 \quad (6)$$

$$1.0 < w/m < 2.5 \quad (7) \text{ and}$$

$$0.017 < m/z < 0.065 \quad (8)$$

The ferrite magnetic material includes at least a Si component as a sub-component. The total amount of the Si component is 0.1 to 3 mass % based on the amount of the main composition, and Ca, R, Sr, Ba, Fe, M, and Si satisfy, in terms of mole ratios, the following formula (9):

$$1.5 \leq [(Ca+R+Sr+Ba)-(Fe+M)/12]/Si \leq 3.5 \quad (9).$$

The ferrite magnetic material of the present invention is represented by the formula (1). Respective elements satisfy the conditions of the formulae (2) to (8). In addition, the ferrite magnetic material further includes a Si component as a sub-component. Further, the metal elements forming the main composition and Si satisfy the relationship represented by the formula (9). As a result, the ferrite magnetic material not only has high Br and HcJ, but also has a high Hk/HcJ.

Further, the present invention provides a magnet formed of the ferrite magnetic material of the present invention, having an arc segment shape, and having a central angle of the shape of 30° or more, and preferably 60° or more.

The ferrite permanent magnet in such an arc segment shape is widely used in applications such as a motor. The ferrite magnetic material of the present invention can provide a magnet in an arc segment shape having high Br and HcJ, and Hk/HcJ.

Further, the ferrite magnetic material of the present invention is very advantageous for forming a magnet having such a shape. Namely, a magnet formed of a ferrite magnetic material, and in an arc segment shape is often formed of a sintered body of a ferrite magnetic material. Such a magnet is manufactured by forming a compact using a ferrite magnetic material before sintering, and burning this. When a sintered body in an arc segment shape is obtained, a compact in a shape corresponding thereto is used.

A compact is generally shrunk during burning at a given ratio. When a compact is magnetically oriented, as observed in the crystal structure, the shrinkage ratio largely varies between the c-axis (easy axis) direction and the a-axis direction. Generally, the shrinkage ratio in the c-axis direction is larger than the shrinkage ratio of the a-axis direction. For this reason, when the crystal structure is oriented and arrayed in an arc shape as the arc segment shape, it exhibits a behavior of shrinkage such that the central angle further increases during burning due to the difference in shrinkage ratio (reduction ratio). Accordingly, in order to obtain an anisotropic shape having a desirable central angle, the compact is previously formed in a somewhat shallow arc (with a rather small central angle) in view of such a shrinking behavior. Still however, when a magnet in a deep arc shape is manufactured, the arc is required to be deepened to a such degree or more even at a stage of a compact.

When a magnet such that the central angle is 30° or more is tried to be obtained, the arc of the compact is also made considerably deep. Therefore, for example, during forming, the vicinities of both ends are not solidified sufficiently; accordingly, forming requires a long time, or the forming pressure is required to be increased. Thus, and as in other cases, severer forming conditions than ever are demanded. As a result, the productivity is reduced. In addition, the reduction of the characteristics of the resulting magnet tends to occur. For this reason, conventionally, it has been difficult to manufacture a ferrite sintered magnet having an anisotropy such that the central angle is 30° or more.

In contrast, the ferrite magnetic material of the present invention has the foregoing specific composition, and hence can also exert an effect of increasing the reduction ratio during burning of the compact. For this reason, with the ferrite magnetic material, a shallow-arc compact can provide a deep-arc (large central-angle) sintered body with more ease than in the related art using a large reduction ratio during burning. Therefore, a magnet in an arc segment shape, formed of the ferrite magnetic material of the present invention has a central angle as large as 30° or more, and preferably 60° or more with ease.

Advantageous Effect of the Invention

In accordance with the present invention, it becomes possible to provide a ferrite magnetic material capable of providing a permanent magnet of which the high Br and HcJ are kept, and which not only has a high Hk/HcJ, but also is in an arc segment shape having a large central angle.

DESCRIPTION OF EMBODIMENTS

Figure 1:
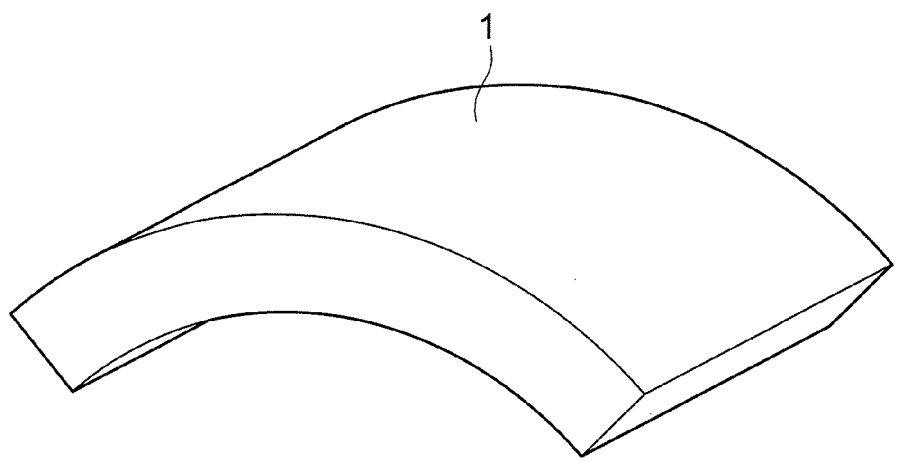
FIG. 1 is a perspective view showing a ferrite permanent magnet of a preferable embodiment.

Below, referring to the accompanying drawings, preferred embodiments of the present invention will be described. In the description of the drawings, the same elements are given the same reference numerals and signs, and an overlapping description thereon will be omitted.

(Ferrite Permanent Magnet)

FIG. 1 is a perspective view showing a ferrite permanent magnet of a preferable embodiment. The ferrite permanent magnet 1 (which will be hereinafter simply referred to as "magnet 1") shown in FIG. 1 has a shape curved so that the end face is in an arc shape, and has a shape commonly called an arc segment shape, a C-shape, a tile shape, an arched shape, or the like. The magnet 1 is a ferrite sintered magnet formed of a sintered body of a ferrite magnetic material.

The ferrite magnetic material forming the magnet 1 has a main phase formed of a ferrite phase having a hexagonal structure, and is preferably a magnetoplumbite type (M type) ferrite. Herein, the main phase is a portion forming crystal grains of the crystal grains and the grain boundary formed between the grains forming the ferrite sintered body, and occupies 95 vol % or more of the sintered body in a preferable case.

The ferrite magnetic material of the present embodiment has a main composition represented by the following formula (1). The main composition is included in the main phase, and forms the hexagonal structure.

$$Ca_{1-w-x-y}R_wSr_xBa_yFe_zM_mO_{19} \tag{1}$$

Herein, in the formula (1), R is at least one element selected from the group consisting of rare earth elements (including Y) and Bi, and includes at least La. M is at least one element selected from the group consisting of Co, Mn, Mg, Ni, Cu, and Zn, and includes at least Co.

In the formula (1), w, x, y, z, and m show the atomic ratios of R, Sr, Ba, Fe, and M, respectively, and satisfy all of the following formulae (2), (3), (4), (5), (6), (7), and (8).

$$0.25 < w < 0.65 \tag{2}$$

$$0.01 < x < 0.45 \tag{3}$$

$$0.0002 < y < 0.011 \tag{4}$$

$$y < x \tag{5}$$

$$8 < z < 11 \tag{6}$$

$$1.0 < w/m < 2.5 \tag{7 and}$$

$$0.017 < m/z < 0.065 \tag{8}$$

Further, the ferrite magnetic material includes, as sub-components other than the main composition, at least a Si component. The total amount of the Si component is 0.1 to 3 mass % based on the amount of the main composition. The Si component is a component including Si in the constituent element. When a plurality of kinds of Si components are included, the total amount thereof is the "total amount" described above.

Further, in the ferrite magnetic material, respective elements of Ca, R, Sr, Ba, Fe, M, and Si have the relationship in which the mole ratios thereof satisfy the following formula (9).

$$1.5 \leq [(Ca+R+Sr+Ba)-(Fe+M)/12]/Si \leq 3.5 \tag{9}$$

Below, the composition of the ferrite magnetic material will be described in more details.

The atomic ratio (1−w−x−y) of Ca in the main composition is preferably more than 0.05 and less than 0.59. When the atomic ratio of Ca is too small, the ferrite magnetic material may not become an M type ferrite. Further, the ratio of a nonmagnetic phase such as $\alpha\text{-}Fe_2O_3$ increases. In addition, R is present in an excess amount to form a nonmagnetic heterogeneous phase such as orthoferrite, resulting in a tendency of degradation of the magnetic characteristics (particularly, Br and HcJ). On the other hand, when the atomic ratio of Ca is too large, M type ferrite may not be formed. Other than this, the nonmagnetic phases such as $CaFeO_{3-x}$ increase, which may cause degradation of the magnetic characteristics.

The elements represented by R include at least La, and in addition, as those other than La, are preferably at least one selected from the group consisting of rare earth elements (including Y) and Bi, and more preferably at least one selected from the group consisting of rare earth elements. However, R in particular preferably includes only La from the viewpoint of improving the anisotropic magnetic field.

The atomic ratio (w) of R in the main composition is more than 0.25 and less than 0.65. Within this range, Br and HcJ, and Hk/HcJ can be favorably obtained. When the atomic ratio of R is too small, the M solute content in the ferrite magnetic material becomes insufficient, resulting in reduction of Br and HcJ. On the other hand, a too large atomic ratio of R results in the formation of nonmagnetic heterogeneous phases such as orthoferrite, leading to reduction of the Hk/HcJ. This makes it difficult to obtain a practical magnet. From such a viewpoint, the atomic ratio of R is preferably 0.3 to 0.55, and more preferably 0.35 to 0.5.

The atomic ratio (x) of Sr is more than 0.01, and less than 0.45. Within this range, favorable Br, HcJ and Hk/HcJ are satisfied. When the atomic ratio of Sr is too small, the ratio of Ca and/or La increases, resulting in reduction of the Hk/HcJ. On the other hand, when the atomic ratio of Sr is too large, Br and HcJ become insufficient. From such a viewpoint, the atomic ratio of Sr is preferably 0.05 to 0.35, and more preferably 0.05 to 0.2.

The atomic ratio (y) of Ba is more than 0.0002 and less than 0.011. Within this range, favorable Br, HcJ and Hk/HcJ are satisfied. When the atomic ratio of Ba is too small, a sufficient Hk/HcJ improving effect cannot be obtained. On the other hand, a too large atomic ratio of Ba disadvantageously results in reduction of Br and HcJ. From such a viewpoint, the atomic ratio of Ba is preferably 0.0006 to 0.010.

Whereas, the atomic ratio (x) of Sr and the atomic ratio (y) of Ba satisfy the relationship of y<x. Thus, it is configured such that the atomic ratio of Sr is larger than the atomic ratio of Ba. As a result, it becomes easy to obtain a sufficiently high Hk/HcJ in addition to a favorable Br. In addition, the reduction ratio as described later is increased, which makes it easy to obtain a magnet in an arc segment shape.

The atomic ratio (z) of Fe is more than 8 and less than 11. Within this range, favorable Br, HcJ, and Hk/HcJ are satisfied. Even when the atomic ratio of Fe is too small or too large, Br and HcJ are disadvantageously reduced. The atomic ratio of Fe is preferably 8.5 to 10.5, and more preferably 9 to 10.

The elements represented by M include at least Co, and in addition, as those other than Co, are preferably at least one selected from the group consisting of Mn, Mg, Ni, Cu, and Zn, and more preferably at least one selected from the group consisting of Mn, Ni, and Zn. However, M in particular preferably includes only Co from the viewpoint of improving the anisotropic magnetic field.

The main composition of the ferrite magnetic material first satisfies the condition that m/z is more than 0.017, and less than 0.065 for the atomic ratio (m) of M. Further, the main composition satisfies the condition that w/m is more than 1.0, and less than 2.5. Satisfaction of these conditions can provide favorable Br, HcJ, and Hk/HcJ. When the atomic ratio of M is too small, favorable Br and HcJ cannot be obtained. Particularly when the ratio of Co is too small, a favorable HcJ cannot be obtained. On the other hand, when the ratio of M is too large, the Br and the HcJ tend to be rather reduced.

From these viewpoints, the m/z is preferably 0.02 to 0.05, and more preferably 0.022 to 0.04. Whereas, the w/m is preferably 1.2 to 2.0, and more preferably 1.5 to 1.8.

The ferrite magnetic material includes sub-components described later in addition to the main composition. The sub-components can be included in either of the main phase and the grain boundaries of the ferrite magnetic material. In the ferrite magnetic material, the one other than the sub-components of the whole is the main composition. From the viewpoint of obtaining sufficient magnetic characteristics, the content of the main composition in the ferrite magnetic material is preferably 90 mass % or more, and more preferably 95 to 100 mass %.

The ferrite magnetic material of the present embodiment includes at least a Si component as a sub-component. The Si component has no particular restriction as long as it has a composition including Si. However, the Si component may be added in the form of, for example, $SiO_2$, $Na_2SiO_3$, or $SiO_2 \cdot nH_2O$. The ferrite magnetic material includes a Si component, and hence has a favorable sinterability. Further, the crystal grain size of the sintered body is appropriately adjusted, resulting in the one favorably controlled in magnetic characteristics. As a result, it becomes possible to obtain a high Hk/HcJ while keeping the Br and the HcJ favorable.

In the ferrite magnetic material, the content of the Si component is 0.1 to 3 mass % in a total amount of Si components in terms of $SiO_2$. When the Si component is in such a content, a high HcJ can be obtained.

Whereas, the mole ratios of Ca, R, Sr, Ba, Fe, M, and Si satisfy the following expression (9):

$$1.5 \leq [(Ca+R+Sr+Ba)-(Fe+M)/12]/Si \leq 3.5 \quad (9).$$

Herein, the magnetoplumbite type structure is generally represented by $AB_{12}O_{19}$. When applied to the composition, [(Ca+R+Sr+Ba)−(Fe+M)/12]/Si in the formula (9) can be expressed as (A−B/12)/Si. This indicates that this formula is the presence ratio (A-site component/Si component) at the grain boundaries of A site components considered to overflow from the main phase and to be present at the grain boundaries and the Si components.

The ferrite magnetic material of the present embodiment satisfies the conditions of the formula (9). This results in the following: even with a composition deviated from the stoichiometric ratio such as that rich in A-site elements (poor in B-site elements), the M type structure is kept favorably. As a result, a high magnetic characteristics (Br and HcJ) are kept, and an excellent Hk/HcJ is obtained. From the viewpoint of obtaining such effects more favorably, [(Ca+R+Sr+Ba)−(Fe+M)/12]/Si is preferably 1.5 to 3.5, and more preferably 1.5 to 3.0.

The ferrite magnetic material includes the main composition and sub-components including at least a Si component. The composition of the ferrite magnetic material can be measured by the fluorescent X-ray quantitative analysis. Further, the presence of the main phase can be observed by X-ray diffraction or electron diffraction.

The ferrite magnetic material of the present embodiment may include other components than Si components as sub-components. As other sub-components, the ferrite magnetic material may have, for example, Al and/or Cr. As a result of these, the HcJ of the magnet 1 tends to be improved. From the viewpoint of obtaining a favorable HcJ improving effect, the content of Al and/or Cr is preferably in a total amount of 0.1 mass % or more in terms of $Al_2O_3$ or $Cr_2O_3$ based on the total amount of the ferrite magnetic material. However, these components may reduce the Br of the magnet 1. Therefore, from the viewpoint of obtaining a favorable Br, the content is desirably set at 3 mass % or less.

Further, the ferrite magnetic material may include B as, for example, $B_2O_3$ as a sub-component. Inclusion of B can reduce the calcination temperature and the sintering temperature for obtaining a sintered body formed of the ferrite magnetic material. Accordingly, it becomes possible to obtain the magnet 1 with good productivity. However, when B is in a too much amount, the saturation magnetization of the magnet 1 may be reduced. Therefore, the content of B is preferably 0.5 mass % or less as $B_2O_3$ based on the total amount of the ferrite magnetic material.

Further, the ferrite magnetic material may include, as sub-components, Ga, Mg, Cu, Mn, Ni, Zn, In, Li, Ti, Zr, Ge, Sn, V, Nb, Ta, Sb, As, W, Mo, or the like in the form of an oxide. The contents thereof are preferably, in terms of the oxide with the stoichiometric composition of each atom, 5 mass % or less for gallium oxide, 5 mass % or less for magnesium oxide, 5 mass % or less for copper oxide, 5 mass % or less for manganese oxide, 5 mass % or less for nickel oxide, 5 mass % or less for zinc oxide, 3 mass % or less for indium oxide, 1 mass % or less for lithium oxide, 3 mass % or less for titanium oxide, 3 mass % or less for zirconium oxide, 3 mass % or less for germanium oxide, 3 mass % or less for tin oxide, 3 mass % or less for vanadium oxide, 3 mass % or less for niobium oxide, 3 mass % or less for tantalum oxide, 3 mass % or less for antimony oxide, 3 mass % or less for arsenic oxide, 3 mass % or less for tungsten oxide, and 3 mass % or less for molybdenum oxide. However, when these are included therein in combination of a plurality thereof, in order to avoid the reduction of the magnetic characteristics, it is desirably configured such that the total amount is 5 mass % or less.

Incidentally, it is preferable that the ferrite magnetic material does not include alkali metal element (such as Na, K, or Rb) as a sub-component. The alkali metal element tends to reduce the saturation magnetization of the magnet 1. However, the alkali metal elements may be included in, for example, the raw material for obtaining the ferrite magnetic material. The alkali metal may be included in the ferrite magnetic material so long as it is in a thus inevitably mixed amount. The content of the alkali metal element not largely affecting the magnetic characteristics is 3 mass % or less.

The ferrite magnetic material forming the magnet 1 is, as described above, in the form of a sintered body, and has a structure including crystal grains (main phase) and grain boundaries. The mean crystal grain size of crystal grains in the sintered body is preferably 1.5 μm or less, more preferably 1.0 μm or less, and further preferably 0.5 to 1.0 μm. The crystal grains have such a mean crystal grain size, so that a high HcJ becomes more likely to be obtained. The crystal grain size of the sintered body of the ferrite magnetic material can be measured by a scanning electron microscope.

Figure 2:
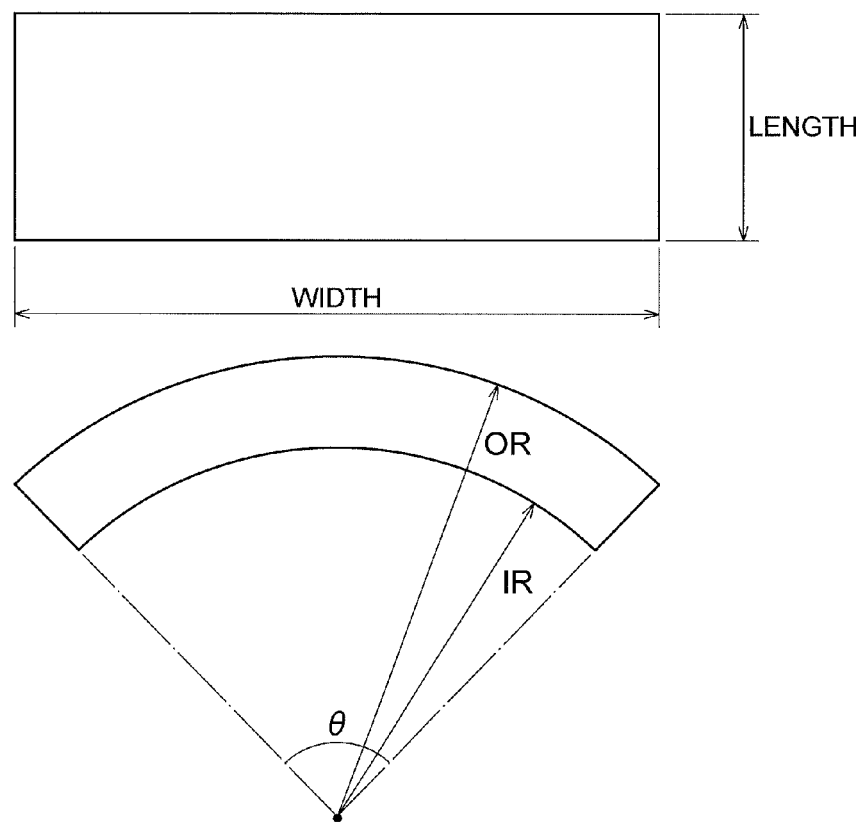
FIG. 2 is views respectively showing the plane surface and the end face of a magnet 1.

The magnet 1 has an arc segment shape in which a flat one is curved in one direction so that the end face is in an arc shape as described above. FIG. 2 is a plan view of the magnet 1 as seen from above, and an end view thereof as seen from the side. Thus, the magnet 1 has a fan-like planar shape having a prescribed central angle. Herein, the central angle of the magnet in an arc segment shape is the value defined in the following manner. Namely, the central angle is the central angle of an arc when the outer side in the end face having an arc shape is assumed to be an arc, and is expressed as θ in the end view shown in FIG. 2. Generally, in the magnet 1 having such a shape, the crystal structure is aligned so as to have a radial anisotropy in the direction of an arrow indicated with OR in the end view of FIG. 2.

Herein, the magnet 1 of the present embodiment is formed of the sintered body of the ferrite magnetic material having the composition and the crystal structure described above. Accordingly, when the magnet 1 has such an arc segment shape, at the time of burning a compact, and obtaining a sintered body, the compact generally shows a shrinking behavior such that the central angle further increases by burning due to the difference in shrinkage ratio between the a-axis direction and the c-axis direction. Incidentally, the difference in shrinkage ratio can be expressed as, for example, the reduction ratio (shrinkage ratio in the c-axis direction/shrinkage ratio in the a-axis direction). The reduction ratio is roughly determined by the composition of the ferrite magnetic material. A larger reduction ratio causes a difference in direction of shrinkage between the direction of the tangent to the arc and the direction of the normal to the arc when the magnet 1 is in an arc segment shape, resulting in the occurrence of shrinkage such that the central angle becomes larger as a whole.

Then, with the ferrite magnetic material of the present embodiment capable of causing such a high reduction ratio, it is possible to obtain a sintered body in a deep arc (with a large central angle) using a large reduction ratio during burning from a compact in a shallow arc with ease. Therefore, the ferrite magnetic material of the present embodiment is advantageous for obtaining the magnet 1 having a central angle as large as 30° or more, and preferably 60° or more.

Up to this point, a description was given to the magnet 1 in accordance with the preferred embodiment. The magnet obtainable in accordance with the present invention is not limited to the foregoing mode so long as it is formed of the ferrite magnetic material of the present invention. For example, the magnet can have various shapes such as plate shape and cylindrical shape other than the arc segment shape having an anisotropy. Even when the magnet is in a shape other than the arc segment shape, it also can acquire a high Hk/HcJ while keeping high Br and HcJ so long as it is formed of the ferrite magnetic material of the present invention.

Further, the magnet 1 is not limited to the one formed of the sintered body of the ferrite magnetic material as described above, and may be, for example, a bonded magnet formed of a powder of the ferrite magnetic material bound by a binder.

In this case, the conditions for the ferrite magnetic material as described above may be satisfied with the powder of the ferrite magnetic material. The mean particle size of the primary particles forming the powder of the ferrite magnetic material has no particular restriction. It is preferably 2 μm or less, more preferably 1 μm or less, and further preferably 0.1 to 1 μm. When the mean particle size is too large, the ratio of multi-domain particles in the powder becomes high, which may result in the reduction of the HcJ. On the other hand, when the mean particle size is too small, the magnetic properties are reduced by the thermal agitation, or the orientability or the formability for forming in the magnetic field is deteriorated.

As the binders, mention may be made of nitrile rubbers (e.g., NBR rubber), chlorinated polyethylene, polyamide resins (e.g., Nylon 6 and Nylon 12 (all, registered trade names)), and the like.

(Method for Manufacturing Ferrite Permanent Magnet)

Then, a description will be given to a preferred embodiment of a method for manufacturing the ferrite permanent magnet as described above. In the following embodiment, there will be shown one example of a method for manufacturing a ferrite sintered magnet formed of a ferrite magnetic material. In the present embodiment, the ferrite sintered magnet can be manufactured through a mixing step, a calcination step, a grinding step, a forming step, and a burning step. The respective steps will be described below.

<Mixing Step>

In the mixing step, the raw materials for a ferrite magnetic material are mixed, resulting in a raw material composition. First, as the raw materials for the ferrite magnetic material, mention may be made of compounds (raw material compounds) including one, or two or more of the elements forming this. The raw material compounds are preferably, for example, powdered ones. As the raw material compounds, mention may be made of oxides of respective elements, or compounds resulting in oxides by burning (such as carbonate, hydroxide, and nitrate). Examples thereof may include $SrCO_3$, $La(OH)_3$, $Fe_2O_3$, $BaCO_3$, $CaCO_3$, and $Co_3O_4$. The mean particle size of the powder of the raw material compound is preferably set at about 0.1 to 2.0 μm, for example, from the viewpoint of enabling uniform mixing.

Further, as the raw materials for the Si component in the ferrite magnetic material, $SiO_2$ may be mentioned. The raw materials have no particular restriction so long as they are Si-including compounds and the like. Whereas, to the raw material powder, if required, there may be mixed raw material compounds (such as elementary substances and oxides) of other sub-components.

The mixing can be performed in the following manner: for example, respective raw materials are weighed so as to obtain the composition of a desirable ferrite magnetic material; after mixing, using a wet attritor, a ball mill, or the like, the mixture is subjected to mixing and a grinding treatment for about 0.1 to 20 hours.

Incidentally, in the mixing step, all the raw materials are not required to be mixed, and some may be added after calcination described later. For example, the Si raw materials (e.g., $SiO_2$) which are sub-components, and raw materials (e.g., $CaCo_3$) for Ca which is a constituent element of the main composition may be added in the grinding (particularly, fine grinding) step after calcination described later. The time of addition may be adjusted so as to facilitate obtaining of the desired composition and magnetic characteristics.

<Calcination Step>

In the calcination step, the raw material powder obtained in the mixing step is calcined. The calcination is preferably performed in an oxidizing atmosphere such as in an air. The temperature of calcination is set within the temperature range of preferably 1100 to 1400° C., more preferably 1100 to 1300° C., and further preferably 1100 to 1250° C. The time of calcination can be set at 1 second to 10 hours, and is preferably 1 second to 3 hours. The calcined body obtained by calcination includes the foregoing main phase (M phase) in an amount of 70% or more. The primary particle size of the main phase is preferably 10 μm or less, and more preferably 2 μm or less.

<Grinding Step>

In the grinding step, the calcined body made granular or massive by the calcination step is ground to be formed into a powder form again. This facilitates forming in a forming step described later. In the grinding step, raw materials not mixed in the mixing step as described above may be added (post-addition of raw materials). The grinding step may be performed, for example, through a two-stage step in which the calcined body is ground (coarse ground) so as to make the calcined body in the form of a coarse powder, then, this is further finely ground (fine grinding).

Coarse grinding can be performed using, for example, a vibrating mill, until the mean particle size becomes 0.5 to 5.0 μm. With fine grinding, the coarse ground material obtained in coarse grinding is further ground by a wet attritor, a ball mill, a jet mill, or the like. With fine grinding, grinding is performed so that the mean particle size of the resulting fine ground material is preferably about 0.08 to 2.0 μm, more preferably 0.1 to 1.0 μm, and further preferably 0.2 to 0.8 μm. The specific surface area of the fine ground material (determined by e.g., a BET method) is preferably set at about 7 to 12 $m^2/g$. The preferable grinding time differs according to the grinding method. For example, in the case of a wet attritor, 30 minutes to 10 hours is preferable. For the wet grinding by a ball mill, about 10 to 50 hours is preferable.

When a part of the raw materials are added in the grinding step, for example, the addition can be performed in fine grinding. In the present embodiment, $SiO_2$ which is a Si component, or $CaCO_3$ which is a Ca component can be added in fine grinding. These may be added in the mixing step or the coarse grinding step.

Further, in the fine grinding step, in order to enhance the magnetic orientation degree of the sintered body obtained after burning, a polyhydric alcohol represented by, for example, the general formula $C_n(OH)_nH_{n+2}$ is preferably added. Herein, the polyhydric alcohol is preferably the one of the general formula where n is 4 to 100, more preferably the one where n is 4 to 30, further preferably the one where n is 4 to 20, and still further preferably the one where n is 4 to 12. As the polyhydric alcohol, for example, sorbitol may be mentioned. Alternatively, two or more polyhydric alcohols may be used in combination. Further, in addition to the polyhydric alcohol, other known dispersant may be used in combination.

When the polyhydric alcohol is added, the addition amount is preferably 0.05 to 5.0 mass %, more preferably 0.1 to 3.0 mass %, and further preferably 0.2 to 2.0 mass % based on the amount of the object for addition (e.g., coarse ground material). Incidentally, the polyhydric alcohol added in the fine grinding step is thermally decomposed and removed in a burning step described later.

<Forming Step>

In the forming step, the ground material (preferably, fine ground material) obtained after the grinding step is formed in a magnetic field, resulting in a compact. Forming can be performed by either method of dry forming and wet forming. From the view point of enhancing the magnetic orientation degree, wet forming is preferably performed.

When forming is performed by wet forming, the following procedure is preferable: for example, the fine grinding step is performed by a wet method, resulting in a slurry; then, the slurry is concentrated to a prescribed concentration, resulting in a slurry for wet forming; and using this, forming is performed. The concentration of the slurry can be performed by centrifugation, filter press, or the like. The slurry for wet forming is preferably the one in which the fine ground material accounts for about 30 to 80 mass % of the total amount. In the slurry, the dispersion medium for dispersing the fine ground material is preferably water. In this case, to the slurry, there may be added a surfactant such as gluconic acid, gluconic acid salt, or sorbitol. Whereas, as the dispersion medium, a nonaqueous solvent may be used. As the nonaqueous solvent, organic solvents such as toluene and xylene can be used. In this case, a surfactant such as oleic acid is preferably added. Incidentally, the slurry for wet forming may be prepared by adding a dispersion medium or the like to the fine ground material in a dry state after fine grinding.

In the wet forming, then, the slurry for wet forming is subjected to magnetic forming. In that case, the forming pressure is preferably about 9.8 to 49 MPa (0.1 to 0.5 ton/cm$^2$). The magnetic field to be applied is preferably set at about 398 to 1194 kA/m (5 to 15 kOe).

In the present embodiment, the magnet 1 comprised of the ferrite magnetic material of the present invention is formed. From this, as described above, when a magnet in an arc segment shape is manufactured, it is possible to cause a high reduction ratio in a burning step described later. Therefore, in the forming step, even when a compact in a shallower arc (with a smaller central angle) than that of a desired magnet is formed, it is possible to obtain a magnet in a deep arc after burning.

Preferably, the central angle of the compact is appropriately set according to the composition of the ferrite magnetic material. For example, the central angle of the compact can be set about 10 to 20% smaller than the central angle of the objective magnet.

<Burning Step>

In the burning step, the compact obtained in the forming step is burned, resulting in a sintered body. As a result, There is obtained the magnet 1 formed of the sintered body of the ferrite magnetic material as described above. When a magnet in an arc segment shape is manufactured, with burning, the compact formed so as to have a prescribed central angle is shrunk. At this step, a given reduction ratio is caused. As a result, the resulting sintered body has a further smaller central angle than that of the compact. In order to obtain a sintered body in a deep arc, the reduction ratio during burning is preferably 1.0 to 2.5, and more preferably 1.5 to 2.5.

Burning can be performed in an oxidizing atmosphere such as in an air. The burning temperature is preferably 1050 to 1270° C., and more preferably 1080 to 1240° C. Whereas, the burning time (the time during which the temperature is held at the burning temperature) is preferably about 0.5 to 3 hours.

Incidentally, when a compact is obtained by the wet forming as described above, the compact is burned while having not been sufficiently dried, thereby to be sharply heated. As a result, volatilization of the dispersion medium and the like vigorously occurs, so that cracking may occur in the compact. Thus, from the viewpoint of avoiding such a disadvantage, preferably, before reaching the burning temperature, the compact is heated at a gentle temperature rising rate of about 0.5° C./min, for example, from room temperature to about 100° C.; thus, the compact is sufficiently dried, thereby to inhibit the occurrence of cracking. When a surfactant (dispersant), or the like is further added, preferably, heating is performed at a temperature rising rate of about 2.5° C./min within the temperature range of, for example, about 100 to 500° C., thereby to sufficiently remove (degrease) these. Incidentally, these treatments may be performed in the beginning of the burning step, or may be separately performed prior to the burning step.

Up to this point, the preferable method for manufacturing a ferrite sintered magnet was described. However, so long as at least the ferrite magnetic material of the present invention is used, and the conditions and the like can be appropriately changed, the manufacturing method is not limited to the foregoing.

Alternatively, when as the magnet, not the ferrite sintered magnet but a bonded magnet is manufactured, it is possible to obtain a bonded magnet including a powder of the ferrite magnetic material of the present invention in the following manner: for example, the steps up to the grinding step described above are performed; then, the resulting ground product and a binder are mixed, and the mixture is formed in a magnetic field.

EXAMPLES

Below, the present invention will be further described in details by way of examples. However, the present invention is not limited to these examples.

Experimental Example 1

Manufacturing of Ferrite Sintered Magnet

First, as the raw materials for the main composition of a ferrite magnetic material, there were prepared iron oxide ($Fe_2O_3$), calcium carbonate ($CaCO_3$), strontium carbonate ($SrCO_3$), cobalt oxide ($Co_3O_4$), barium carbonate ($BaCO_3$), and lanthanum hydroxide ($La(OH)_3$). The raw materials were weighed so that the main composition after burning was the following composition formula. Whereas, as a Si component, silicon oxide ($SiO_2$) was prepared so as to be in an amount of 0.69 mass % based on the amount of the main composition. Composition formula of main composition:

$$Ca_{1-w-x-y}La_wSr_xBa_yFe_zCo_mO_{19}$$

In Experimental Example 1, raw materials were prepared in a plurality of combinations so as to obtain ferrite magnetic materials respectively different in atomic ratios of the main composition as shown in Table 1. In the Experimental Example 1, particularly, the atomic ratios of Ca (1−w−x−y=0.0333 to 0.6007) and Sr (x=0.0003 to 0.5700) were largely changed, thus manufacturing various ferrite sintered magnets of samples 1-1 to 1-9.

Below, a description will be given to a method for manufacturing a ferrite sintered magnet using the raw materials. The raw materials for the main composition of the raw materials after the weighing were mixed and ground by means of a wet attritor for 10 minutes, resulting in a slurry (mixing step). The slurry was dried. Then, there was performed calcination for holding the slurry in an atmosphere at 1250° C. for 2 hours (calcination step).

The resulting calcined powder is coarsely ground by means of a small rods vibrating mill for 10 minutes. To the coarse ground material, added were silicon oxide ($SiO_2$) weighed above, and calcium carbonate ($CaCO_3$) in an amount of 1.90 mass %, and sorbitol in an amount of 0.45 mass % based on the amount of the coarse ground material, respectively. The mixture was finely ground by means of a wet ball mill for 33 hours, resulting in a slurry (up to this point, grinding step).

The slurry obtained after fine grinding was adjusted so that the solid content concentration was 73 to 75%, resulting in a slurry for wet forming. The slurry for wet forming was formed in an applied magnetic field of 796 kA/m (10 kOe) using a wet magnetic field forming machine, resulting in a compact having a cylindrical shape with a diameter of 30 mm×a thickness of 15 mm (forming step). The resulting compact was sufficiently dried at room temperature in the atmosphere. Then, burning in which the compact was held at 1200° C. in the atmosphere for 1 hour was performed, thereby resulting in a ferrite sintered magnet (burning step).

(Evaluation of Ferrite Sintered Magnet)

The top and bottom surfaces of the cylinder of each ferrite sintered magnet obtained in Experimental Example 1 were processed. Then, using a B-H tracer of the maximum applied magnetic field of 755 kA/m (12 kOe), the Br (mT) and the HcJ (kA/m) thereof were determined. In addition, the external magnetic field intensity (Hk) when Br became 90% was measured. Based on this, the Hk/HcJ (%) was determined.

The resulting results are summarized in Table 1.

With this, the La/Co (w/m=0.72 to 2.65) were changed. Thus, various ferrite sintered magnets of samples 2-1 to 2-9 were manufactured.

(Evaluation of Ferrite Sintered Magnet)

Using respective ferrite sintered magnets obtained in Experimental Example 2, the Br (mT), the HcJ (kA/m), and the Hk/HcJ (%) thereof were determined in the same manner as in Experimental Example 1. The obtained results are shown in Table 2.

TABLE 1

| | Atomic ratio of main composition | | | | | | Magnetic characteristics | | |
|---|---|---|---|---|---|---|---|---|---|
| Sample | Fe z | Co m | Sr x | Ca 1-w-x-y | La w | Ba y | Br (mT) | HcJ (kA/m) | Hk/HcJ (%) |
| 1-1 | 9.25 | 0.25 | 0.0003 | 0.6007 | 0.3982 | 0.0008 | 463.5 | 259.1 | 39.0 |
| 1-2 | 9.25 | 0.25 | 0.1011 | 0.5006 | 0.3976 | 0.0008 | 468.3 | 388.6 | 87.0 |
| 1-3 | 9.25 | 0.25 | 0.1287 | 0.4729 | 0.3976 | 0.0008 | 469.9 | 385.6 | 89.0 |
| 1-4 | 9.25 | 0.25 | 0.1500 | 0.4535 | 0.3958 | 0.0008 | 466.9 | 401.0 | 87.9 |
| 1-5 | 9.25 | 0.25 | 0.1565 | 0.4476 | 0.3952 | 0.0008 | 468.4 | 354.3 | 87.0 |
| 1-6 | 9.25 | 0.25 | 0.1981 | 0.4062 | 0.3949 | 0.0008 | 463.5 | 377.2 | 87.3 |
| 1-7 | 9.25 | 0.25 | 0.3731 | 0.2288 | 0.3973 | 0.0008 | 465.4 | 357.6 | 89.2 |
| 1-8 | 9.25 | 0.25 | 0.4545 | 0.1487 | 0.3959 | 0.0008 | 461.4 | 300.0 | 91.0 |
| 1-9 | 9.25 | 0.25 | 0.5700 | 0.0333 | 0.3959 | 0.0008 | 460.0 | 207.8 | 96.2 |

From Table 1, it is revealed as follows: when the ratio (x) of Sr is more than 0.0003 and less than 0.4545, and the ratio

TABLE 2

| | | Atomic ratio of main composition | | | | | | Magnetic characteristics | | |
|---|---|---|---|---|---|---|---|---|---|---|
| Sample | La/Co w/m | Fe z | Co m | Sr x | Ca 1-w-x-y | La w | Ba y | Br (mT) | HcJ (kA/m) | Hk/HcJ (%) |
| 2-1 | 0.72 | 9.25 | 0.25 | 0.1034 | 0.7157 | 0.1801 | 0.0008 | 414.6 | 274.0 | 89.2 |
| 2-2 | 1.05 | 9.25 | 0.25 | 0.1028 | 0.6341 | 0.2623 | 0.0008 | 460.1 | 358.0 | 85.6 |
| 2-3 | 1.40 | 9.25 | 0.25 | 0.1040 | 0.5458 | 0.3494 | 0.0008 | 464.8 | 385.5 | 86.0 |
| 2-4 | 1.58 | 9.25 | 0.25 | 0.1011 | 0.5033 | 0.3949 | 0.0008 | 467.2 | 377.2 | 87.0 |
| 2-5 | 1.77 | 9.25 | 0.25 | 0.1017 | 0.4561 | 0.4414 | 0.0008 | 468.3 | 388.6 | 86.4 |
| 2-6 | 1.96 | 9.25 | 0.25 | 0.1040 | 0.4062 | 0.4890 | 0.0008 | 468.3 | 358.0 | 85.3 |
| 2-7 | 2.20 | 9.25 | 0.25 | 0.1034 | 0.3461 | 0.5497 | 0.0008 | 463.2 | 346.0 | 84.1 |
| 2-8 | 2.41 | 9.25 | 0.25 | 0.1042 | 0.2934 | 0.6016 | 0.0008 | 462.0 | 322.0 | 90.0 |
| 2-9 | 2.65 | 9.25 | 0.25 | 0.1012 | 0.2359 | 0.6621 | 0.0008 | 428.0 | 234.4 | 73.6 |

(1−w−x−y) of Ca is more than 0.1487 and less than 0.6007, it is possible to obtain a high Hk/HcJ while keeping the Br and the HcJ favorable.

Experimental Example 2

Manufacturing of Ferrite Sintered Magnet

In Experimental Example 2, ferrite sintered magnets were manufactured in the same manner as in Example 1, except that a plurality of combinations of raw materials were prepared so as to obtain ferrite magnetic materials respectively different in atomic ratios of the main composition as shown in Table 2. In the Experimental Example 2, particularly, the atomic ratio of La(w=0.1801 to 0.6621) was largely changed.

From Table 2, it is revealed as follows: when the ratio (w) of La is more than 0.1801 and less than 0.6621, and the La/Co (w/m) is more than 0.72 and less than 2.65, it is possible to obtain a high Hk/HcJ while keeping the Br and the HcJ favorable.

Experimental Example 3

Manufacturing of Ferrite Sintered Magnet

In Experimental Example 3, ferrite sintered magnets were manufactured in the same manner as in Example 1, except that a plurality of combinations of raw materials were prepared so as to obtain ferrite magnetic materials respectively different in atomic ratios of the main composition as shown in Table 3. In the Experimental Example 3, particularly, the atomic ratio of Fe(z=7.80 to 12.10) was largely changed, to manufacture various ferrite sintered magnets of samples 3-1 to 3-10.

(Evaluation of Ferrite Sintered Magnet)

Using respective ferrite sintered magnets obtained in Experimental Example 3, the Br (mT), the HcJ (kA/m), and the Hk/HcJ (%) thereof were determined in the same manner as in Experimental Example 1. The obtained results are shown in Table 3.

TABLE 3

| | Atomic ratio of main composition | | | | | | Magnetic characteristics | | |
|---|---|---|---|---|---|---|---|---|---|
| Sample | Fe z | Co m | Sr x | Ca 1-w-x-y | La w | Ba y | Br (mT) | HcJ (kA/m) | Hk/HcJ (%) |
| 3-1 | 7.80 | 0.21 | 0.1471 | 0.4570 | 0.3951 | 0.0008 | 441.6 | 340.0 | 89.6 |
| 3-2 | 8.62 | 0.23 | 0.1505 | 0.4526 | 0.3961 | 0.0008 | 461.6 | 371.3 | 89.6 |
| 3-3 | 9.01 | 0.24 | 0.1500 | 0.4540 | 0.3952 | 0.0008 | 466.8 | 374.1 | 88.8 |
| 3-4 | 9.25 | 0.25 | 0.1500 | 0.4535 | 0.3958 | 0.0008 | 466.9 | 401.0 | 87.9 |
| 3-5 | 9.45 | 0.26 | 0.1504 | 0.4540 | 0.3948 | 0.0008 | 467.0 | 401.0 | 86.0 |
| 3-6 | 9.71 | 0.26 | 0.1505 | 0.4523 | 0.3964 | 0.0008 | 467.8 | 369.7 | 86.0 |
| 3-7 | 9.97 | 0.27 | 0.1508 | 0.4531 | 0.3953 | 0.0008 | 459.0 | 345.6 | 87.0 |
| 3-8 | 10.40 | 0.28 | 0.1523 | 0.4550 | 0.3919 | 0.0008 | 462.5 | 340.1 | 86.5 |
| 3-9 | 11.40 | 0.29 | 0.1496 | 0.4541 | 0.3955 | 0.0008 | 462.5 | 282.1 | 83.7 |
| 3-10 | 12.10 | 0.32 | 0.1504 | 0.4541 | 0.3947 | 0.0008 | 458.0 | 221.0 | 87.0 |

From Table 3, it is revealed as follows: when the ratio (z) of Fe is more than 7.80 and less than 11.40, it is possible to obtain a high Hk/HcJ while keeping the Br and the HcJ favorable.

Experimental Example 4

Manufacturing of Ferrite Sintered Magnet

In Experimental Example 4, ferrite sintered magnets were manufactured in the same manner as in Example 1, except that a plurality of combinations of raw materials were prepared so as to obtain ferrite magnetic materials respectively different in atomic ratios of the main composition as shown in Table 4. In the Experimental Example 4, particularly, the atomic ratio of Co (m=0.00 to 0.70) was largely changed. With this, the Co/Fe(m/z=0.000 to 0.076) and the La/Co (w/m=0.564 to 3.589) were changed. Thus, various ferrite sintered magnets of samples 4-1 to 4-7 were manufactured.

(Evaluation of Ferrite Sintered Magnet)

Using respective ferrite sintered magnets obtained in Experimental Example 4, the Br (mT), the HcJ (kA/m), and the Hk/HcJ (%) thereof were determined in the same manner as in Experimental Example 1. The obtained results are shown in Table 4.

From Table 4, it is revealed as follows: when the Co/Fe (m/z) is more than 0.012 and less than 0.065, and the La/Co (w/m) is more than 0.659 and less than 3.589, it is possible to obtain a high Hk/HcJ while keeping the Br and the HcJ favorable.

Experimental Example 5

Manufacturing of Ferrite Sintered Magnet

In Experimental Example 5, ferrite sintered magnets were manufactured in the same manner as in Example 1, except that a plurality of combinations of raw materials were prepared so as to obtain ferrite magnetic materials respectively different in atomic ratio of the main composition as shown in Table 5. In the Experimental Example 5, particularly, the atomic ratio of Ba (y=0.0002 to 0.0150) was largely changed, to manufacture various ferrite sintered magnets of samples 5-1 to 5-11.

(Evaluation of Ferrite Sintered Magnet)

Using respective ferrite sintered magnets obtained in Experimental Example 5, the Br (mT), the HcJ (kA/m), and the Hk/HcJ (%) thereof were determined in the same manner as in Experimental Example 1.

Further, regarding each ferrite sintered magnet, for the ratio of shrinkage of the compact during burning in manufacturing thereof, the thickness (shh(%)=100−(thickness of sintered body/thickness of compact)×100), and the diameter (shφ(%)=100−(diameter of sintered body/diameter of compact)×100) were determined, respectively. Based on this, the reduction ratio before and after sintering (shh/shφ: c-axis direction/a-axis direction) was calculated. The obtained results are summarized in Table 5.

TABLE 4

| | | | Atomic ratio of main composition | | | | | | Magnetic characteristics | | |
|---|---|---|---|---|---|---|---|---|---|---|---|
| Sample | w/m | m/z | Fe z | Co m | Sr x | Ca 1-w-x-y | La w | Ba y | Br (mT) | HcJ (kA/m) | Hk/HcJ (%) |
| 4-1 | — | 0.000 | 9.25 | 0.00 | 0.1494 | 0.4543 | 0.3955 | 0.0008 | 223.0 | 243.0 | 95.0 |
| 4-2 | 3.589 | 0.012 | 9.25 | 0.11 | 0.1516 | 0.4528 | 0.3948 | 0.0008 | 447.0 | 378.0 | 93.0 |
| 4-3 | 1.979 | 0.022 | 9.25 | 0.20 | 0.1492 | 0.4543 | 0.3958 | 0.0008 | 463.0 | 393.0 | 90.0 |
| 4-4 | 1.586 | 0.027 | 9.25 | 0.25 | 0.1500 | 0.4535 | 0.3958 | 0.0008 | 466.9 | 401.0 | 87.9 |
| 4-5 | 1.066 | 0.040 | 9.25 | 0.37 | 0.1537 | 0.4510 | 0.3945 | 0.0008 | 460.0 | 410.0 | 87.9 |
| 4-6 | 0.659 | 0.065 | 9.25 | 0.60 | 0.1511 | 0.4530 | 0.3951 | 0.0008 | 430.0 | 372.0 | 85.1 |
| 4-7 | 0.564 | 0.076 | 9.25 | 0.70 | 0.1493 | 0.4551 | 0.3948 | 0.0008 | 417.0 | 267.0 | 76.0 |

TABLE 5

| Sample | Atomic ratio of main composition | | | | | | Magnetic characteristics | | | Shrinkage ratio during burning | | Reduction ratio |
|---|---|---|---|---|---|---|---|---|---|---|---|---|
| | Fe z | Co m | Sr x | Ca 1-w-x-y | La w | Ba y | Br (mT) | HcJ (kA/m) | Hk/HcJ (%) | shh (%) | sh ø (%) | shh/sh ø |
| 5-1 | 9.25 | 0.25 | 0.1552 | 0.4533 | 0.3912 | 0.0002 | 464.2 | 391.8 | 84.2 | 26.97 | 12.72 | 2.12 |
| 5-2 | 9.25 | 0.25 | 0.1553 | 0.4529 | 0.3912 | 0.0006 | 467.0 | 398.0 | 86.3 | 26.70 | 12.50 | 2.14 |
| 5-3 | 9.25 | 0.25 | 0.1500 | 0.4535 | 0.3958 | 0.0008 | 466.9 | 401.0 | 87.9 | 26.98 | 12.55 | 2.15 |
| 5-4 | 9.25 | 0.25 | 0.1536 | 0.4508 | 0.3945 | 0.0011 | 466.6 | 396.8 | 87.3 | 27.11 | 12.53 | 2.16 |
| 5-5 | 9.25 | 0.25 | 0.1541 | 0.4505 | 0.3937 | 0.0017 | 467.1 | 397.7 | 86.1 | 27.40 | 12.70 | 2.16 |
| 5-6 | 9.25 | 0.25 | 0.1538 | 0.4511 | 0.3924 | 0.0027 | 465.1 | 399.5 | 86.5 | 26.91 | 12.44 | 2.16 |
| 5-7 | 9.25 | 0.25 | 0.1504 | 0.4519 | 0.3932 | 0.0045 | 464.1 | 399.4 | 87.1 | 27.12 | 12.30 | 2.21 |
| 5-8 | 9.25 | 0.25 | 0.1488 | 0.4512 | 0.3937 | 0.0063 | 464.3 | 400.8 | 87.4 | 27.00 | 12.28 | 2.20 |
| 5-9 | 9.25 | 0.25 | 0.1447 | 0.4519 | 0.3923 | 0.0110 | 464.6 | 387.0 | 87.9 | 27.15 | 12.23 | 2.22 |
| 5-10 | 9.25 | 0.25 | 0.1415 | 0.4511 | 0.3912 | 0.0150 | 457.5 | 366.3 | 83.7 | 27.34 | 12.17 | 2.25 |
| 5-11 | 9.25 | 0.25 | 0.0048 | 0.5936 | 0.3915 | 0.0101 | 452.0 | 354.0 | 72.1 | 26.99 | 12.67 | 2.13 |

From Table 5, it is revealed as follows: when the ratio (y) of Ba is more than 0.0002 and less than 0.0110, it is possible to obtain a high Hk/HcJ while keeping the Br and the HcJ favorable; in addition, it is possible to obtain a high reduction ratio. Further, it has been confirmed as follows: the sample 5-11 in which the ratio (x) of Sr is smaller than the ratio (y) of Ba is insufficient particularly in Br and Hk/HcJ; further, the reduction ratio is smaller than those of other samples satisfying the condition of y<x.

Experimental Example 6

Manufacturing of Ferrite Sintered Magnet

In Experimental Example 6, ferrite sintered magnets were manufactured in the same manner as in Example 1, except that a plurality of combinations of raw materials were prepared so that the ratios (mol %) of constituent elements of ferrite magnetic materials forming the ferrite sintered magnets were respectively different as shown in Table 6. The ratio (mol %) of each constituent element is the value obtained by normalizing the content in terms of oxide shown in Table 6 of each element based on the total amount as 100%. In the Experimental Example 6, particularly, the content of the Si component ($SiO_2$) was largely changed. With this, the value of "[(Ca+R+Sr+Ba)-(Fe+M)/12]/Si" was changed. Thus, various ferrite sintered magnets of samples 6-1 to 6-5 were manufactured.

(Evaluation of Ferrite Sintered Magnet)

Using respective ferrite sintered magnets obtained in Experimental Example 6, the Br (mT), the HcJ (kA/m), and the Hk/HcJ (%) thereof were determined in the same manner as in Experimental Example 1. The obtained results are shown in Table 6.

As shown in Table 6, it has been revealed as follows: when the [(Ca+R+Sr+Ba)-(Fe+M)/12]/Si is more than 1.43 and less than 3.58, it is possible to obtain a high Hk/HcJ while keeping the Br and the HcJ favorable.

Experimental Example 7

Measurement of Reduction Ratio

First, cylindrical ferrite sintered magnets were manufactured in the same manner as in Example 1, except that the atomic ratios (y) of Ba in the main compositions were 0.0002 and 0.0045. Regarding these, for the ratio of shrinkage of the compact during burning, the thickness (shh(%)=100-(thickness of sintered body/thickness of compact)×100), and the diameter (shφ(%)=100-(diameter of sintered body/diameter of compact)×100) were determined, respectively. Based on this, the reduction ratio before and after sintering (shh/shφ: c-axis direction/a-axis direction) was calculated.

(Manufacturing of Arc Segment Type Ferrite Sintered Magnet)

Therewith, there were manufactured arc segment type ferrite sintered magnets shown in FIG. 1, formed of the same ferrite magnetic materials as these, respectively. Specifically, ferrite sintered magnets were obtained in the same manner as in Experimental Example 1, except that a forming step was performed in order to obtain the arc segment shape, after obtaining each slurry for wet forming.

In Experimental Example 7, in the case using either of the two types of ferrite magnetic materials, the compact dimensions were adjusted, respectively, so as to obtain the same sintered body dimensions as shown in Table 7. The compact dimensions required for obtaining the same sintered body dimensions using respective ferrite magnetic materials are

TABLE 6

| | Composition of ferrite magnetic material (mol %) | | | | | | | | | | | | (SrLaCaBa—(FeCoZnMn)/12)/Si | Magnetic characteristics | | |
|---|---|---|---|---|---|---|---|---|---|---|---|---|---|---|---|---|
| Sample | $Fe_2O_3$ | SrO | BaO | $Al_2O_3$ | $SiO_2$ | CaO | MnO | ZnO | $Cr_2O_3$ | $La_2O_3$ | CoO | CuO | | Br (mT) | HcJ (kA/m) | Hk/HcJ (%) |
| 6-1 | 78.739 | 2.505 | 0.014 | 0.015 | 2.474 | 7.780 | 0.768 | 0.006 | 0.055 | 3.397 | 4.230 | 0.017 | 1.43 | 443.0 | 370.0 | 87.0 |
| 6-2 | 79.137 | 2.517 | 0.013 | 0.015 | 1.988 | 7.817 | 0.771 | 0.006 | 0.056 | 3.413 | 4.250 | 0.017 | 1.79 | 462.4 | 394.4 | 85.8 |
| 6-3 | 79.432 | 2.526 | 0.014 | 0.015 | 1.621 | 7.846 | 0.774 | 0.006 | 0.056 | 3.426 | 4.266 | 0.017 | 2.20 | 468.7 | 379.8 | 86.0 |
| 6-4 | 79.528 | 2.530 | 0.014 | 0.015 | 1.499 | 7.857 | 0.776 | 0.006 | 0.056 | 3.431 | 4.272 | 0.017 | 2.39 | 470.8 | 366.0 | 84.0 |
| 6-5 | 79.931 | 2.542 | 0.014 | 0.015 | 1.004 | 7.895 | 0.779 | 0.006 | 0.056 | 3.448 | 4.293 | 0.017 | 3.58 | 472.0 | 281.5 | 70.4 | shown in Table 7. Respective dimensions of OR, IR, width, and length in Table 7 are the dimensions of portions shown in FIG. 2, respectively. Further, shh (%), shφ, and shh/shφ in Table 7 are the values obtained by performing measurements with cylindrical ferrite sintered magnets formed of their respective corresponding ferrite magnetic materials.

TABLE 7

| Dimension of each site | | Sintered body dimension | y 0.0002 shh/shφ 2.12 | | y 0.0045 shh/shφ 2.21 | |
|---|---|---|---|---|---|---|
| | | | shφ(%) 12.7 | shh(%) 27.0 | shφ(%) 12.3 | shh(%) 27.1 |
| | | | Formed product dimension | | | |
| OR | (mm) | 43.29 | 59.27 | | 59.40 | |
| IR | (mm) | 34.47 | 47.20 | | 47.30 | |
| Width | (mm) | 22.02 | 25.32 | | 25.20 | |
| Length | (mm) | 26.49 | 30.35 | | 30.20 | |
| Central angle | (°) | 29.5 | 24.7 | | 24.5 | |

As shown in Table 7, its has been confirmed as follows: when sintered bodies with the same dimensions are formed, a high atomic ratio of Ba, i.e., a large substitution amount of Ba to the A-site can increase the reduction ratio; thus, a compact with a smaller central angle can be used in order to obtain a ferrite sintered magnet having a prescribed central angle.

Experimental Example 8

Ferrite sintered magnets formed of two types of ferrite magnetic materials were manufactured in the same manner as in Experimental Example 7, except that the dimensions of the objective sintered bodies were changed as shown in Table 8. At this step, the dimensions of respective compacts required for obtaining the same sintered body dimensions were determined. The obtained results are shown in Table 8.

TABLE 8

| Dimension of each site | | Sintered body dimension | y 0.0002 shh/shφ 2.12 | | y 0.0045 shh/shφ 2.21 | |
|---|---|---|---|---|---|---|
| | | | shφ(%) 12.7 | shh(%) 27.0 | shφ(%) 12.3 | shh(%) 27.1 |
| | | | Formed product dimension | | | |
| OR | (mm) | 45.29 | 62.02 | | 62.15 | |
| IR | (mm) | 34.51 | 47.25 | | 47.35 | |
| Width | (mm) | 43.54 | 50.52 | | 50.30 | |
| Length | (mm) | 43.85 | 50.24 | | 50.00 | |
| Central angle | (°) | 57.5 | 48.1 | | 47.7 | |

As shown in Table 8, its has been confirmed as follows: when sintered bodies with the same dimensions are formed, for a ferrite magnetic material with a large substitution amount of Ba, a compact with a smaller central angle can be used.

Experimental Example 9

Ferrite sintered magnets formed of two types of ferrite magnetic materials were manufactured in the same manner as in Experimental Example 7, except that the dimensions of the objective sintered bodies were changed as shown in Table 9. At this step, respective compact dimensions required for obtaining the same sintered body dimensions were determined. Further, manufacturing of sintered bodies using respective ferrite magnetic materials was respectively performed 10000 times. Out of these, the number of occurrences of cracking in each sintered body was counted. In addition, in the forming step, the mean time required for filling the slurry for wet forming into a mold was determined. The obtained results are shown in Table 9.

TABLE 9

| Dimension of each site | | Sintered body dimension | y 0.0002 shh/shφ 2.12 | | y 0.0045 shh/shφ 2.21 | |
|---|---|---|---|---|---|---|
| | | | shφ(%) 12.7 | shh(%) 27.0 | shφ(%) 12.3 | shh(%) 27.1 |
| | | | Formed product dimension | | | |
| OR | (mm) | 17.13 | 23.45 | | 23.50 | |
| IR | (mm) | 14.72 | 20.16 | | 20.20 | |
| Width | (mm) | 31.09 | 38.20 | | 38.10 | |
| Length | (mm) | 27.98 | 32.05 | | 31.90 | |
| Central angle | (°) | 130.4 | 109.1 | | 108.3 | |
| Evaluation of cracks and filling time | | | | | | |
| Crack | (number) | | 101/10000 | | 89/10000 | |
| Filling time | (sec) | | 5.2 | | 5.1 | |

As shown in Table 9, its has been confirmed as follows: when sintered bodies with the same dimensions are formed, for a ferrite magnetic material with a large substitution amount of Ba, a compact with a smaller central angle can be used. Further, a ferrite magnetic material with a large substitution amount of Ba can reduce cracking during manufacturing of a sintered body with a large central angle, and can also shorten the filling time during forming.

REFERENCE SIGNS LIST

1 ... magnet.

The invention claimed is:

1. A ferrite magnetic material having a main phase comprising a ferrite phase having a hexagonal structure,
wherein the ferrite magnetic material has a main composition represented by the following formula (1):

$$Ca_{1-w-x-y}R_wSr_xBa_yFe_zM_mO_{19} \quad (1)$$

(where in the formula (1), R is at least one element selected from the group consisting of rare earth elements (including Y) and Bi, and includes at least La, and M is at least one element selected from the group consisting of Co, Mn, Mg, Ni, Cu, and Zn, and includes at least Co),
w, x, y, z, and m in the formula (1) satisfying the following formulae (2), (3), (4), (5), (6), (7), (8), and (10):

$$0.25 < w < 0.65 \quad (2)$$

$$0.05 \leq x < 0.2 \quad (3)$$

$$0.0002 < y < 0.011 \quad (4)$$

$$y < x \quad (5)$$

$$8 < z < 11 \quad (6)$$

$$1.0 < w/m < 2.5 \quad (7)$$

$$0.017 < m/z < 0.065 \quad (8), \text{ and}$$

$$0.05 < (1-w-x-y) < 0.59 \quad (10),$$

the ferrite magnetic material includes at least a Si component as a sub-component, the total amount of the Si component being 0.1 to 3 mass % based on the amount of the main composition, and the mole ratios of Ca, R, Sr, Ba, Fe, M, and Si satisfy the following formula (9):

$$1.5 \leq [(Ca+R+Sr+Ba)-(Fe+M)/12]/Si \leq 3.5. \tag{9}$$

2. A magnet comprising the ferrite magnetic material according to claim 1, the magnet having an arc segment shape, and having a central angle of the shape of 30° or more.

3. The magnet according to claim 2, wherein the central angle is 60° or more.

* * * * *